No. 825,960. PATENTED JULY 17, 1906.
H. DAHL & M. MARTIN.
SIGNAL DEVICE FOR INDICATING SPEED.
APPLICATION FILED APR. 22, 1905.
3 SHEETS—SHEET 1.
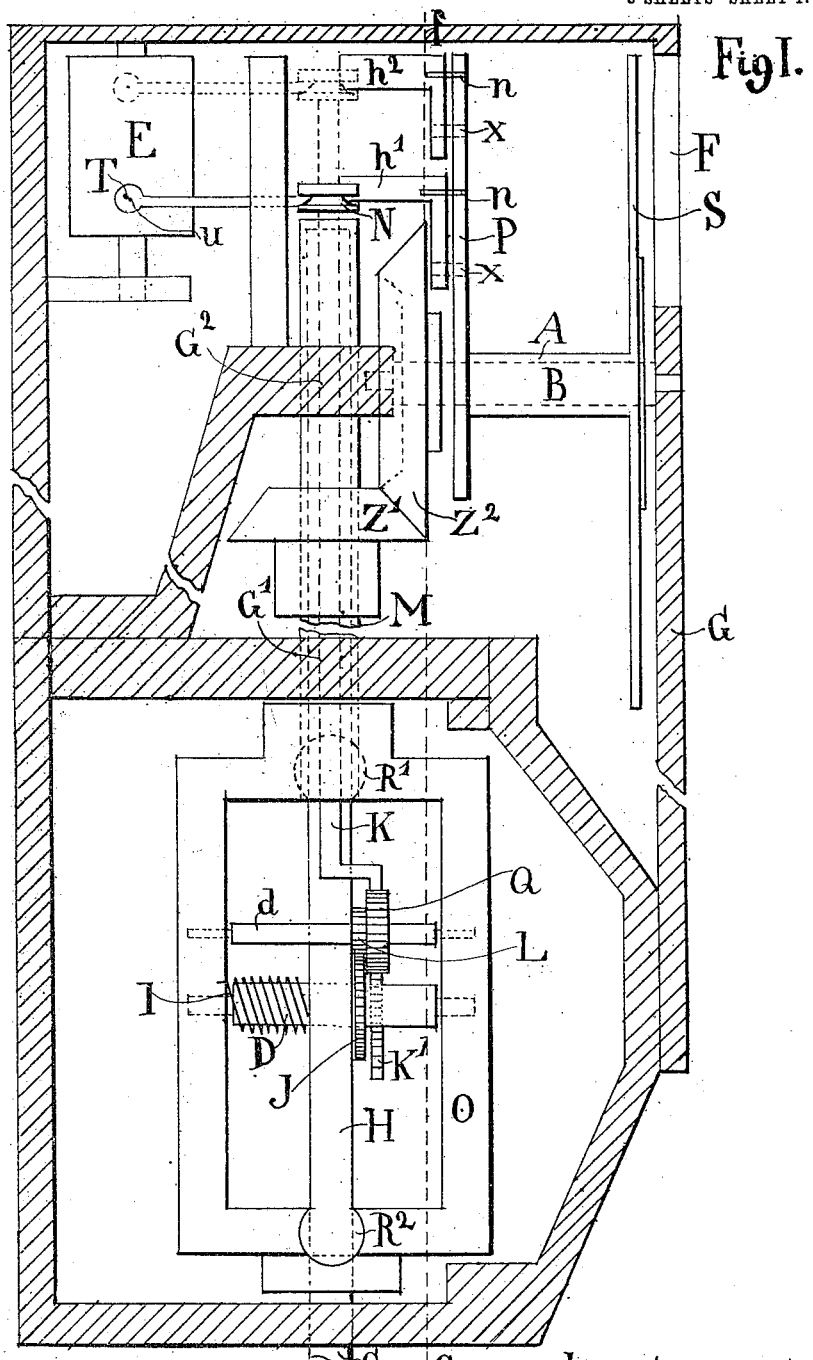
Fig I.
Wittnesses.
Karl Martin
Inventors.
Hans Dahl
Mon Martin

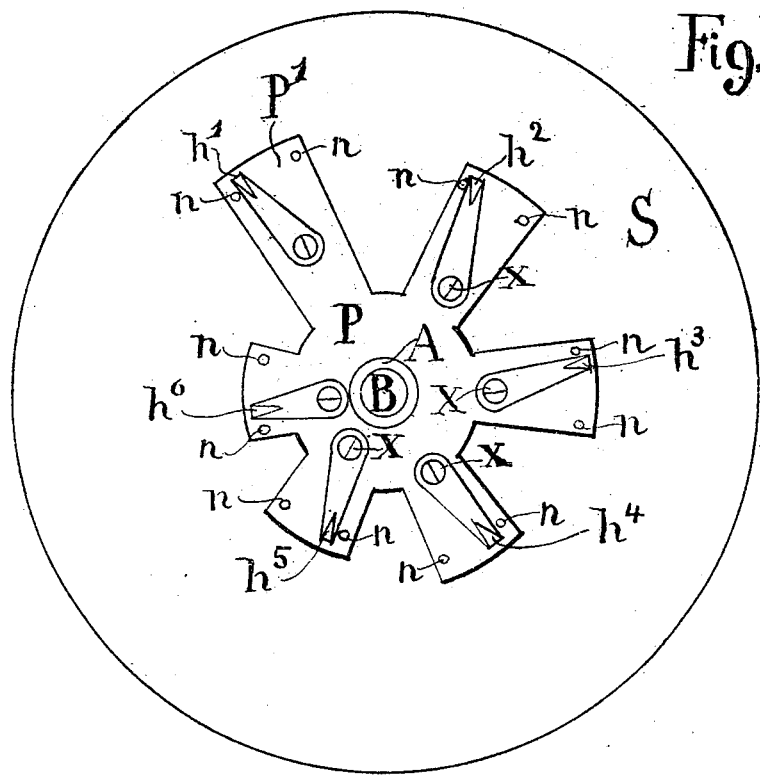

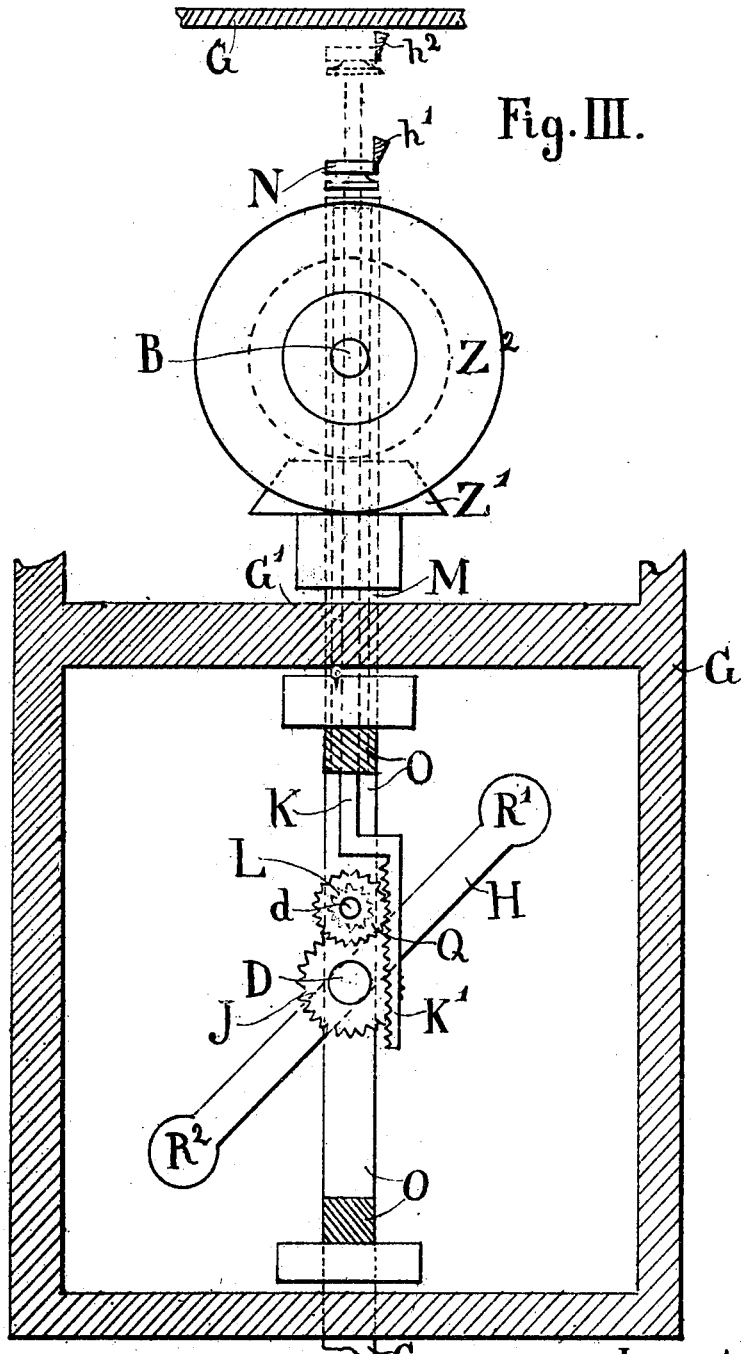

UNITED STATES PATENT OFFICE.

HANS DAHL AND MAX MARTIN, OF BERLIN, GERMANY; SAID MARTIN ASSIGNOR TO SAID DAHL.

SIGNAL DEVICE FOR INDICATING SPEED.

No. 825,960.    Specification of Letters Patent.    Patented July 17, 1906.

Application filed April 22, 1905. Serial No. 257,015.

*To all whom it may concern:*

Be it known that we, HANS DAHL, a subject of the King of Norway, and MAX MARTIN, a subject of the German Emperor, residents of Berlin, in the Kingdom of Prussia and German Empire, have invented new and useful Improvements in Signal Devices for Indicating Speed, of which the following is a specification.

Our invention relates to a visible-signal device for indicating groups of speeds.

The device is particularly adapted for use in indicating the speed of motor-cars and other vehicles, but is also applicable for other purposes.

According to our invention a signal contrivance is arranged in such manner that it can be rotated or otherwise moved by a rotating body of any suitable kind, while it is arrested independently of the said rotating body by other appropriate means actuated by the body whose speed is to be indicated on each occasion of such speed overstepping a certain predetermined speed limit or one of a series of such limits, the group of speeds contained between each two such limits being distinctively characterized on the signal contrivance.

An essential feature of our invention is that the energy necessary for rotating the signal contrivance does not have to be supplied by the means employed for arresting such contrivance, as this would greatly interfere with the accuracy of the indication and even render such illusory. The signal contrivance therefore is driven by a source of energy independent of such arresting device—as, for example, by the body whose speed is to be indicated, such as a motor-car axle. This constitutes a great advantage over prior apparatus for a similar purpose.

Our invention is illustrated in the accompanying drawings, in which—

Figure 1 is a vertical section of the signal device. Fig. 2 is a rear view of the arresting-plate. Fig. 3 is a sectional view taken at right angle to Fig. 1 on the line *f g*.

G is a casing of any suitable description furnished with a window F. In this casing bearings are provided for a short shaft B, on which is mounted a sleeve A, which fits sufficiently tightly to be frictionally rotated by the shaft B. At one end the sleeve is rigidly attached to the signal-disk S, provided with differently-colored panels or compartments, each of which is destined to signal a certain group of speeds, being visible through the window F in the casing. At the other end of the sleeve is an arresting device consisting of a plate P, the radial arms P' of which increase successively in length, as shown in Fig. 2. On these arms P' are pivoted at $x$ successively nearer to the center of the plate P catches $h'$ $h^6$, the extent of whose motion is limited by the studs $n$ $n'$.

On the shaft C whose speed is to be indicated there is mounted within the casing G a frame O, which presents bearings for a horizontal axis D. On the latter is mounted the arm H, having at its ends balanced diametrically-opposed centrifugal members $R'$ $R^2$. Mounted on the axis D is also a gear J, meshing with a pinion L, mounted on a second axis $d$, carried by the frame O and having mounted on it a second gear Q. This latter meshes with the lower racked end $K'$ of a bent vertical bar K, sliding in a hollow shaft M, secured to the frame O and having its bearings at $G'$ $G^2$ in the casing G. This shaft M has mounted on it a bevel-gear $Z'$, meshing with a second bevel-gear $Z^2$, mounted on the shaft B.

At the top of the reciprocating bar K there is mounted a wheel or disk N, adapted to engage with the horizontal arms of the catches $h'$ $h^6$.

The operation of the apparatus is as follows: On the shaft C rotating it will revolve the frame O and shaft M, whereby, by means of the gears $Z'$ $Z^2$, the shaft B will also be rotated and with it the signal-disk S. Owing to rotation of the frame O, moreover, the centrifugal members $R'$ $R^2$ will swing out more or less, depending upon the speed, and will turn the axis D correspondingly. The gears J L meshing together will cause the gear Q to engage with the rack K', whereby the bar K will be elevated. This will bring the wheel N into the path of rotation of one of the catches $h'$ $h^6$, which being thus stopped will cause arrest of the plate P, and thus of the signal-disk S. That colored panel of the latter which corresponds to the catch arrested will consequently be held displayed before the window F. Since each of the differently-colored panels represents a different speed group, the group of speeds within which the present speed of the shaft C lies will thus be visibly indicated at the window. On the speed of the shaft C increasing or decreasing to such an extent that it is no longer contained within the said speed group indicated by the displayed panel the wheel N, responding to the action of the centrifugal members R' R², will rise or fall, respectively, and will thus come in contact with the catch h' h⁸ of one of the longer or shorter arms P' of the plate P. The disk S will thus first be released and then again arrested by another catch engaging with the wheel N, another colored panel consequently appearing at the window F. A spiral spring I, coiled on the shaft D and secured to the arm H, acts to restore the latter to its initial position. The wheel N may be grooved to receive the extremity of an arm T, which either directly or indirectly actuates a suitable recording instrument whereby the speed can be graphically registered, for instance, on a ribbon of paper carried by a drum driven by clockwork. One manner of recording is shown in Fig. 1. On the drum E there moves in well-known manner a paper band or the like adapted to be marked by the pencil u, fixed in the arm T.

In the case of vehicles it will be found advantageous to so locate the apparatus that the rack-bar K K' lies horizontal, whereby the disturbing influence of gravity and of vertical shocks is avoided.

Instead of a disk it is obvious that any other suitable device may be used to indicate the groups of speed. Likewise any form of arresting device may be employed instead of the plate P, with catches coöperating with a wheel N. It will also be understood that we in no wise desire to limit ourselves to the combination with the particular form of means shown for operating the signal member, as the latter may be rotated or otherwise actuated by any suitable means, whether mechanical, electrical, or pneumatic, wholly independent of the motion of the body whose speed is to be indicated.

Having thus described our invention, what we claim as new, and desire to secure by Letters Patent, is—

1. A signal device for indicating collections of speeds, comprising, in combination, a rotating body, signal contrivance influenced by the movements of the said rotating body, said signal contrivance having indicating portions, each portion adapted to indicate a group of the speeds between certain predeterminated limits and means, actuated by the body whose speed is to be indicated, for arresting the signal contrivance independently of the said rotating body on each occasion of such speed overstepping said limits, substantially as described.

2. A signal device for indicating collections of speeds, comprising, in combination a rotating body, a signal body presenting a disk with distinctive markings, each adapted to indicate a group of the speeds between certain predeterminated limits, said disk influenced by the movements of the said rotating body, and means, actuated by the body whose speed is to be indicated, for arresting the signal member independently of the said rotating body on each occasion of such speed overstepping said limits, substantially as described.

3. A signal device for indicating collections of speeds, comprising, in combination, a rotating body, signal contrivance, influenced by the movements of the said rotating body, said signal contrivance having indicating portions, each portion adapted to indicate a group of the speeds between certain predetermined speeds and a centrifugal governor actuated by the body whose speed is to be indicated, having a centrally-mounted arm carrying diametrically-opposed balanced members, and mechanism operated by the said centrifugal governor for arresting the signal contrivance independently of the said rotating body on each occasion of such speed overstepping said limits, substantially as described.

4. A signal device for indicating collections of speeds, comprising, in combination, a rotating body, signal contrivance influenced by the movements of the said rotating body, said signal contrivance having indicating portions, each portion adapted to indicate a group of the speeds between certain predetermined limits and means actuated by the body whose speed is to be indicated, for arresting the signal contrivance independently of the said rotating body on each occasion of such speed overstepping said limits, and means for recording the speed, actuated by the aid of the said means for arresting the signal contrivance, substantially as described.

In testimony whereof we have signed our names to this specification in the presence of two subscribing witnesses.

HANS DAHL.
MAX MARTIN.

Witnesses:
 WOLDEMAR HAUPT,
 HENRY HASPER.